United States Patent [19]
Marques

[11] Patent Number: 6,041,462
[45] Date of Patent: Mar. 28, 2000

[54] POWERED HAND-HELD APPLIANCE FOR DOMESTIC AND INDUSTRIAL USE

[76] Inventor: Carlos Santos Marques, Friesengergstrasse 207, CH-8055 Zurich, Switzerland

[21] Appl. No.: 09/194,637

[22] PCT Filed: Jun. 6, 1997

[86] PCT No.: PCT/CH97/00228

§ 371 Date: Nov. 30, 1998

§ 102(e) Date: Nov. 30, 1998

[87] PCT Pub. No.: WO97/47439

PCT Pub. Date: Dec. 18, 1997

[30] Foreign Application Priority Data

Jun. 10, 1996 [CH] Switzerland .............................. 1441/96

[51] Int. Cl.⁷ ................................................. A46B 13/00
[52] U.S. Cl. ................. 15/28; 15/22.1; 15/97.1; 173/217; 366/197; 366/207; 134/140; 134/157
[58] Field of Search ................................ 15/28, 90, 22.1, 15/23, 97.1; 134/140, 149, 157; 366/197, 199, 207; 173/217; 451/358, 359; 81/57.13; 464/51, 52

[56] References Cited

U.S. PATENT DOCUMENTS

| | | | |
|---|---|---|---|
| 2,840,673 | 6/1958 | Burton | 200/302.2 |
| 3,114,924 | 12/1963 | Morrison . | |
| 4,202,067 | 5/1980 | Stamatovic | 15/28 |
| 4,215,601 | 8/1980 | Mann | 81/57.13 |
| 4,223,418 | 9/1980 | Pedrini . | |
| 4,294,133 | 10/1981 | Hurley | 74/502.4 |
| 4,757,806 | 7/1988 | Muchisky et al. . | |
| 4,886,388 | 12/1989 | Gulker et al. . | |
| 4,989,323 | 2/1991 | Casper et al. | 30/296.1 |
| 4,993,502 | 2/1991 | McCullough | 173/217 |
| 5,018,228 | 5/1991 | Bogaerts et al. | 451/359 |

FOREIGN PATENT DOCUMENTS

| | | |
|---|---|---|
| 0057151 | 8/1982 | European Pat. Off. . |
| 0176450 | 4/1986 | European Pat. Off. . |
| 0414603 | 2/1991 | European Pat. Off. . |
| 0465285 | 1/1992 | European Pat. Off. . |
| 0529287 | 3/1993 | European Pat. Off. . |
| 2449855 | 3/1986 | Germany . |
| 883661 | 12/1961 | United Kingdom . |

*Primary Examiner*—Robert J. Warden, Sr.
*Assistant Examiner*—Kaj K. Olsen
*Attorney, Agent, or Firm*—Edwin D. Schindler

[57] ABSTRACT

The hand-held implement has a fixed motor and a hand-held appliance part on which a tool is mounted. The hand-held appliance part is connected to the fixed motor via a driving shaft and a Bowden cable only. The hand-held appliance part has a slide, moving which operates the Bowden cable. The fixed motor is thereby switched on and off and controlled, its output being adjusted according to the amount of draft applied to the Bowden cable. To produce high torque, the hand-held appliance part incorporates a worm gear pair wherein the driving shaft leading to the appliance part drives a worm that engages with a worm wheel, the driven axle of which projects from the housing, enabling a large number of different tools to be mounted on the driven axle.

10 Claims, 9 Drawing Sheets

POWERED HAND-HELD APPLIANCE FOR DOMESTIC AND INDUSTRIAL USE

This invention relates to a powered hand-held appliance for domestic and industrial use with a fixed motor and a hand-held appliance part on which a tool is mounted.

BACKGROUND OF INVENTION

There already exist a multitude of different electric appliances and, in particular, hand-held appliances, for a great variety of tasks in domestic and industrial contexts. In the home, one often finds multi-purpose kitchen appliances for processing food in a variety of different ways such as e.g. blending, kneading, grating, chopping, beating, mixing, whipping cream etc. Then there are the bathroom appliances such as e.g. manicure systems for doing fingernails and toenails, or for filing away patches of hard skin. There are also a variety of appliances for massaging parts of the body. In the industrial sector one finds an even greater number of systems and hand-held appliances for all kinds of different work.

Often, the usual practice is to use a special tool with its own electric motor for each particular task. These motors are often not powerful enough. No suitable multi-purpose appliance yet exists for dealing with all kinds of cleaning work, especially the type that involves contact with water or even immersion in water, such as e.g. the classic task of washing up dishes and cutlery. But food, too, such as fruits and vegetables, potatoes for instance, and salads are often washed in water, or at least rinsed under running water. And as a general rule, shoes are still cleaned at home with a handbrush. When the shoes or boots are heavily soiled, they are held under running water and cleaned with a handbrush. The same technique is used to clean all kinds of dirty objects, both in domestic and industrial environments. In hospitals, workshops, industrial units and many other locations, the cleaning of objects, devices and tools is a routine daily task. Very many cleaning tasks involving water are still done by hand. Cars are often cleaned by hand with a brush or a sponge, using a lot of water. Dirty garden implements or tools are cleaned by hand with a brush in water or under running water. In the shower, people wash themselves by hand under running water. Hence there are no end of washing and cleaning tasks that are executed with water and a brush or a sponge—but always by hand.

SUMMARY OF INVENTION

It is now the task of this invention, to create, on the one hand, a powered hand-held appliance for domestic and industrial use with a fixed motor and a hand-held appliance part which can be used without problem under water or under running water, and which, on the other hand, has a sufficiently powerful motor that can be regulated while in use with one finger of the hand holding the appliance.

This task is solved by a powered hand-held appliance for domestic and industrial use with a fixed motor and a hand-held appliance part on which a tool is mounted, characterized in that the hand-held appliance part is connected with the fixed motor only via a driving shaft and a Bowden cable device.

Advantageous embodiments of such a hand-held appliance will be presented in the following description with reference to the drawings. The operating principle of this hand-held appliance will be explained, and tools for various purposes will be illustrated in the drawings and described. This hand-held appliance can, of course, be used in conjunction with many more tools than those presented here. What is important, however, is the principle that the motor and the hand-held appliance are absolutely separate elements, and the hand-held appliance itself is only connected mechanically with the motor, i.e. it is not connected electrically with the motor and has absolutely no electrical components so that the user need have no fear about immersing it in water.

DETAILED DESCRIPTION OF THE INVENTION

Figure 1:
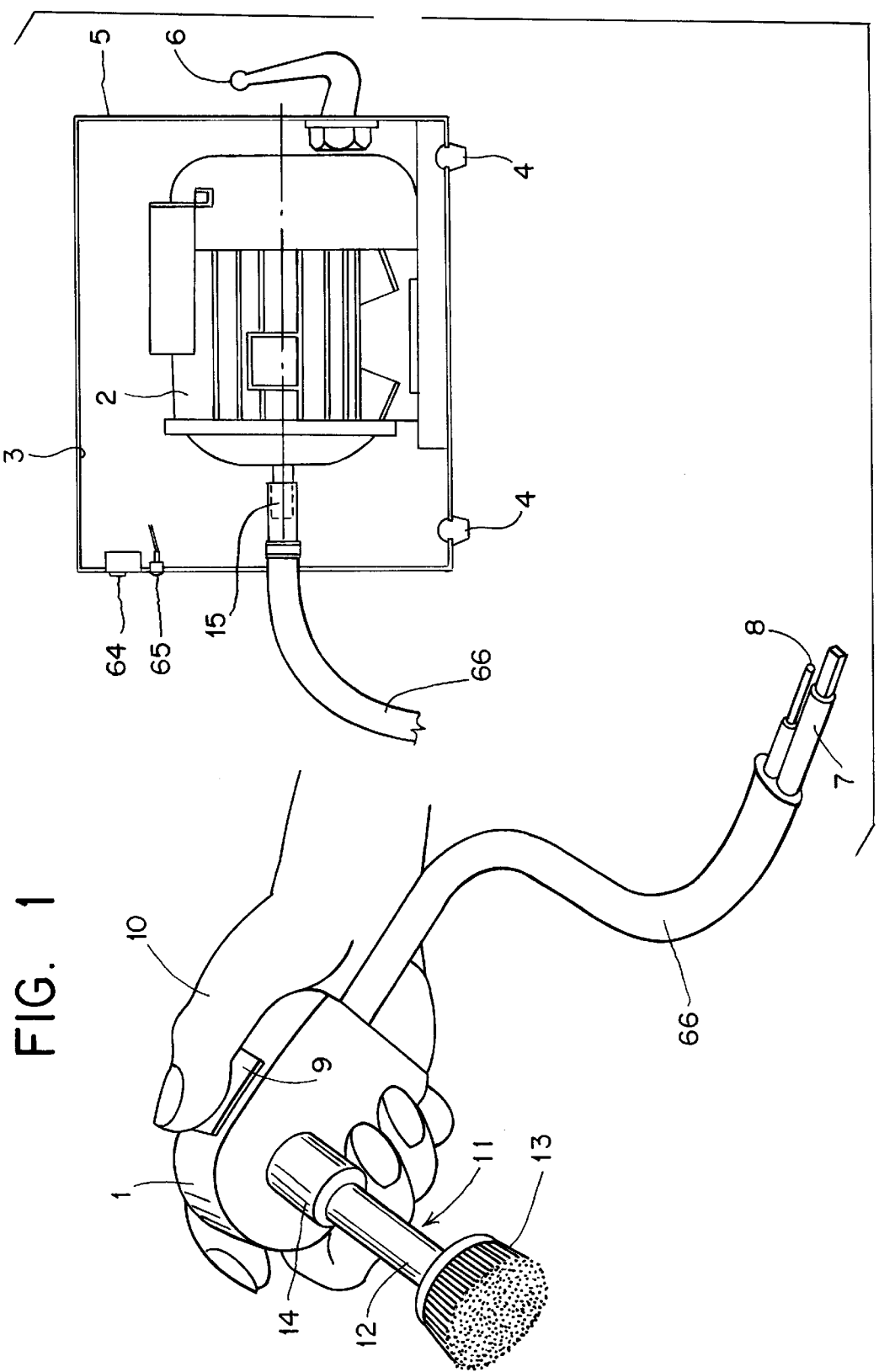
FIG. 1: An overall view of a powered hand-held appliance with a brush as the tool.

FIG. 1 shows the basic principle of this powered hand-held appliance for domestic and industrial use. It has a hand-held appliance part 1 and a fixed motor 2, which is accommodated here in a housing 3. Housing 3 rests on rubber feet 4 and is provided with ventilation slits 5 for cooling the motor 2. Furthermore, housing 3 is fitted with a handle 6 so that fixed motor 2 can easily be carried to wherever required. The motor, which is connected to the mains electricity supply, is turned on via a main switch 64, which is indicated by a lamp 65. Because the motor remains in one place when actually in use, it can be of a relatively heavy design, which allows it to be made correspondingly powerful. For outdoor work the electric motor can be replaced by a combustion motor in the form of the type of commonly used fixed motor. The hand-held appliance 1, i.e. the part 1 which is actually held in one hand, is connected to fixed motor 2 by a driving shaft 7 and a Bowden cable device 8 only. Driving shaft 7 leads from the driven axle 15 of motor 2 to the handheld appliance 1 and transmits the mechanical power and the torque of motor 2. The power is regulated from hand-held appliance 1 via Bowden cable device 8. The greater the traction applied to the cable of the Bowden cable device, the greater the power transmitted. The cable of the Bowden cable device 8 is spring-loaded. If no traction is exerted on the cable, motor 2 switches off, or goes into standby mode if it is a combustion motor. In the case of an electric motor, the power is regulated via a regulating device operated by the Bowden cable, whilst in the case of a combustion motor, the Bowden cable can be the motor's actual accelerator device. The driving shaft 7 and the Bowden cable device 8 can both be accommodated inside the same cable sheath 66 so that they are well protected, and so that the connection between the motor and the hand-held appliance is visually attractive, too. On hand-held appliance 1 a sliding switch 9 is visible, which in this instance is operated by the thumb 10 of the hand holding appliance 1. The Bowden cable device is operated by moving slide 9. The mechanics of this will be described in detail below. Underneath hand-held appliance 1, the tool part 11 attached at the moment is visible. This consists here of a tool housing 12 inside which there is a rotating axle, on the end of which is mounted the actual tool 13. In the example shown, the tool is a round flat-brush. The top end of tool part 11 can be attached to the underneath of the housing by means of a bayonet lock 14, with the driven axle of the housing engaging by friction with the rotating axle of tool part 11. In another embodiment, the bayonet lock itself can rotate as well and transmit the torque so that the whole tool part 11 is made to rotate. This embodiment is advantageous for applications requiring greater torques.

Figure 2:
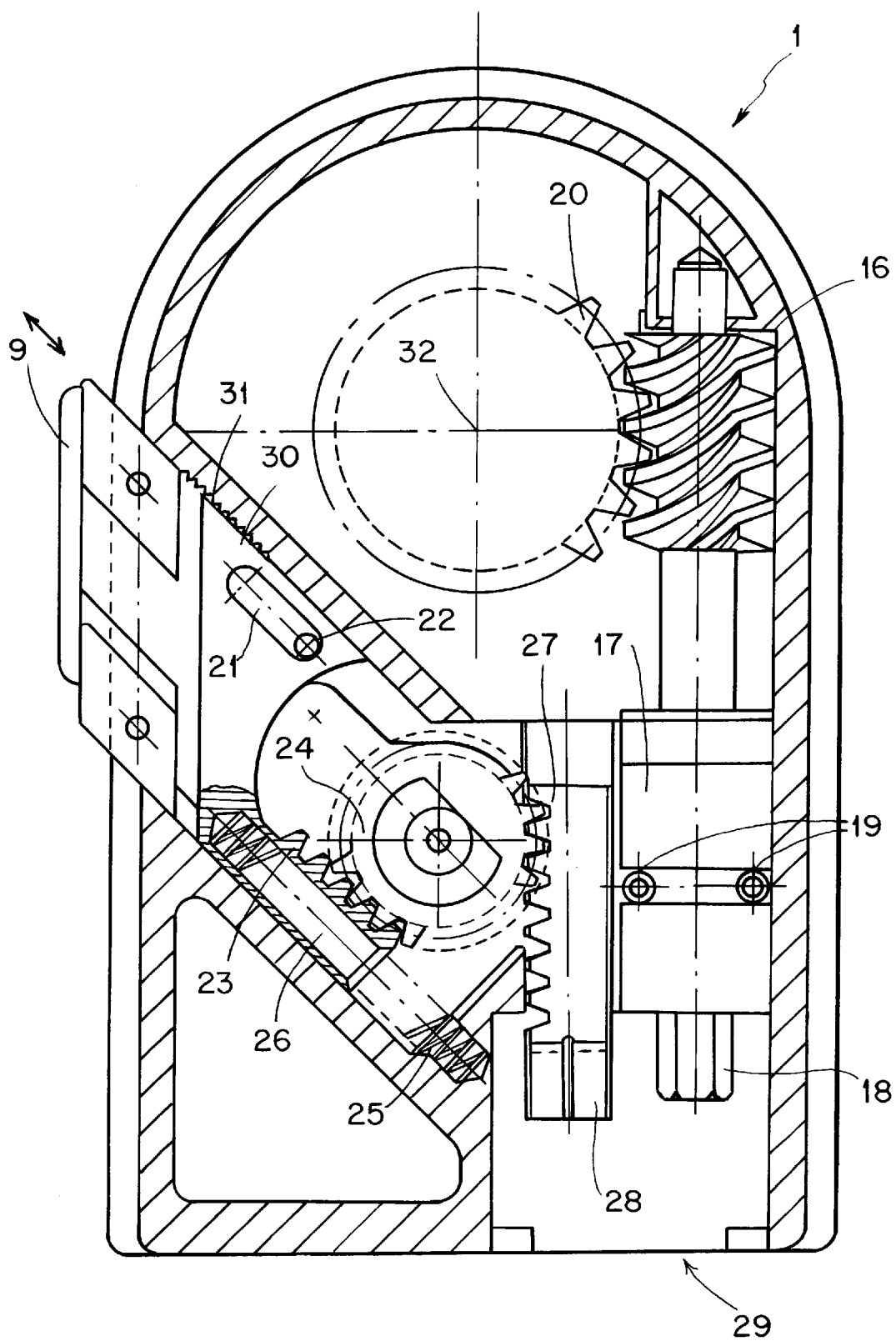
FIG. 2: A view of the inside of the actual hand-held appliance.

FIG. 2 shows the inside of hand-held appliance 1. It is a view from above into the open housing, which is shown in a section. Running longitudinally inside this housing 1 there is a worm 16. It is mounted to the front of the housing and further back it is fixed in a pivot bearing 17 that is screwed into housing 1 by means of two screws 19. At its rear end, worm 16 ends in a hexagonal element 18, onto which the driving shaft can be attached. Worm 16 itself engages with a worm wheel 20, underneath which is mounted an external or internal hexagonal element (not visible here), onto which the rotatable axle of the tool part can be attached. In another embodiment, the worm wheel can, via a strong central axle, also drive a drive plate on the outside of housing 1 onto which a tool can then be attached by means of bayonet locks or a thread. To the left of the drawing one can see slide 9, which can be moved to and fro inside housing 1 in the direction of the arrow. To this end slide 9 is conducted inside the housing itself and seals the inside of the housing off from the outside, allowing the appliance to be used under water. Contrived inside slide 9 there is a slit 21 into which a bolt 22 projects. This limits the movement of the slide in both directions. The inside of slide 9 forms a toothed rack 23. This engages in a pinion 24. Slide 9 is also acted on by a compression spring 25 which sits inside housing 1, placed inside a bore 26 in the slide. If slide 9 is now pushed into the housing with the thumb of the right hand gripping the entire housing, toothed rack 23 is moved towards the inside of the housing, causing pinion 24 to rotate anticlockwise in this drawing. Correspondingly, toothed rack 27, with which pinion 24 also engages, moves upwards in this drawing. The cable 28 of the Bowden cable device 8 is attached to the rear end of toothed rack 27. The driving shaft and the Bowden cable device are connected through the opening 29 at the back of housing 1. The end of the driving shaft is fitted with a hexagon socket which fits onto hexagonal element 18, and is held in place by the housing itself so that the driving shaft is rigidly connected with housing 1. The same applies to the Bowden cable device, resp. the cable sheath inside which runs cable 28 of the Bowden cable device. To allow the appliance to be operated under water, the connection between the sheath cable and the housing is watertight. The operator can set a certain power level via slide 9 thanks to the fact that the slide is provided with teeth 30 which engage with corresponding teeth 31 in the housing. As accurately as possible, the operator starts by depressing slide 9 with his thumb in its direction of movement. Once the required power level is reached, the operator then presses his thumb slightly forwards so that the teeth 30 on slide 9 engage in the teeth 31 in housing 1. To release this setting, slide 9 is moved slightly further towards the housing whilst being pulled towards the rear at the same time, thereby releasing the two sets of teeth whereupon the slide is pushed outwards by the force of spring 25 until the motor stops. The driven axle 32 of this hand-held appliance 1 projects away from the base of the housing at a right angle and therefore runs at approximately a right angle to the palm of the hand holding housing 1.

Figure 3:
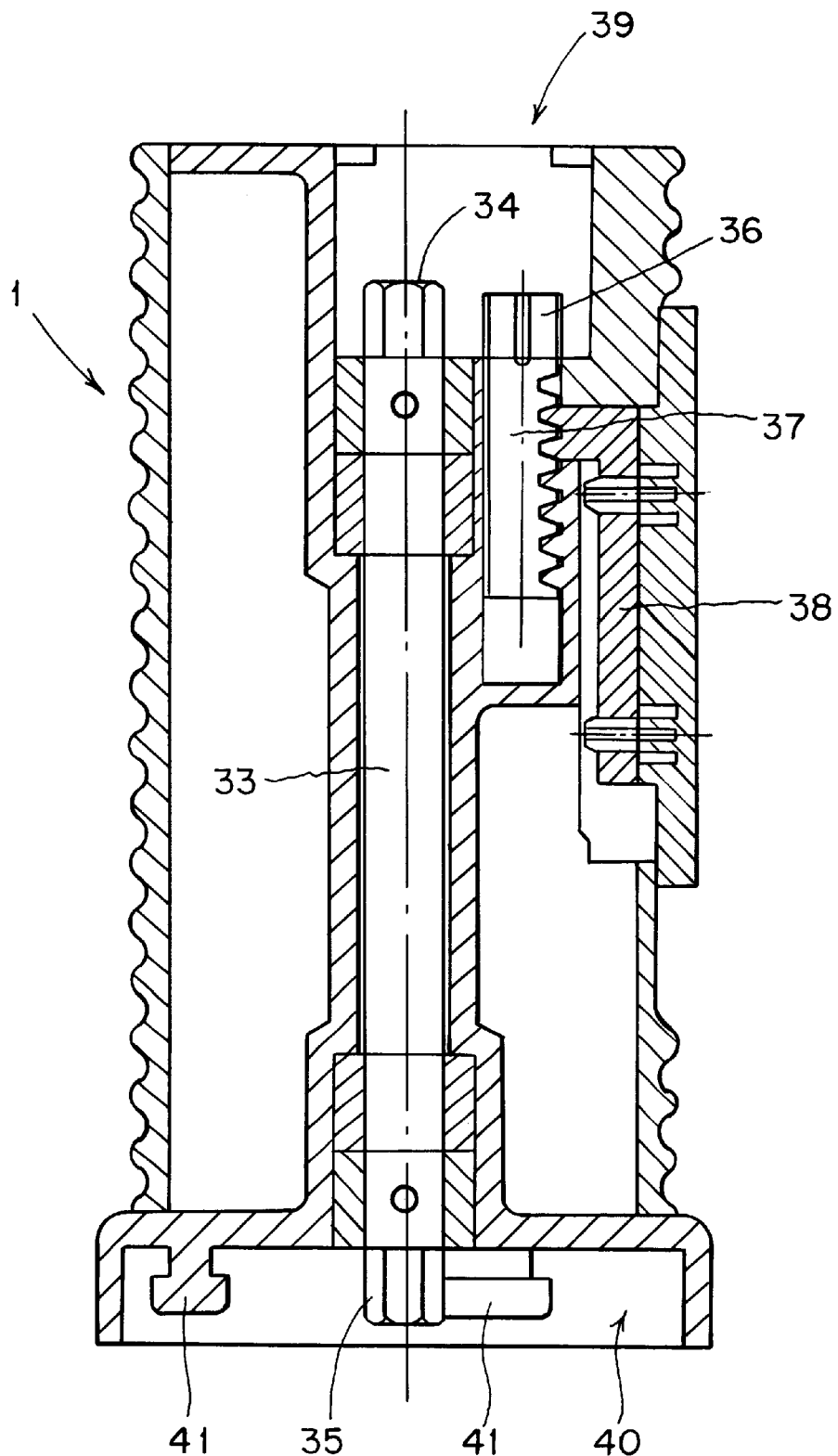
FIG. 3: A view of the inside of an alternative hand-held appliance.

FIG. 3 shows an alternative embodiment of the hand-held appliance. Housing 1 is round here with an undulated surface to ensure a securer grip. Through its longitudinal centre runs axle 33, which has a hexagonal element 34 at its rear end for connecting the driving shaft, and another hexagonal element 35 at the front for connecting the rotatable axle of the tool part. The cable 36 of the Bowden cable device is operated via a toothed rack 37, which can be moved to and fro by a slide 38 directly. The driving shaft and the Bowden cable device are connected through opening 39 in housing 1. At the front of the housing there is a receiving element 40 for connecting a tool part. Inside receiving element 40 there are three locking elements 41 belonging to a bayonet lock, by means of which a tool part can be securely attached by friction to housing 1, with its rotatable axle being connected, as already mentioned, to the hexagonal element 35 of driven axle 33.

Figure 4:
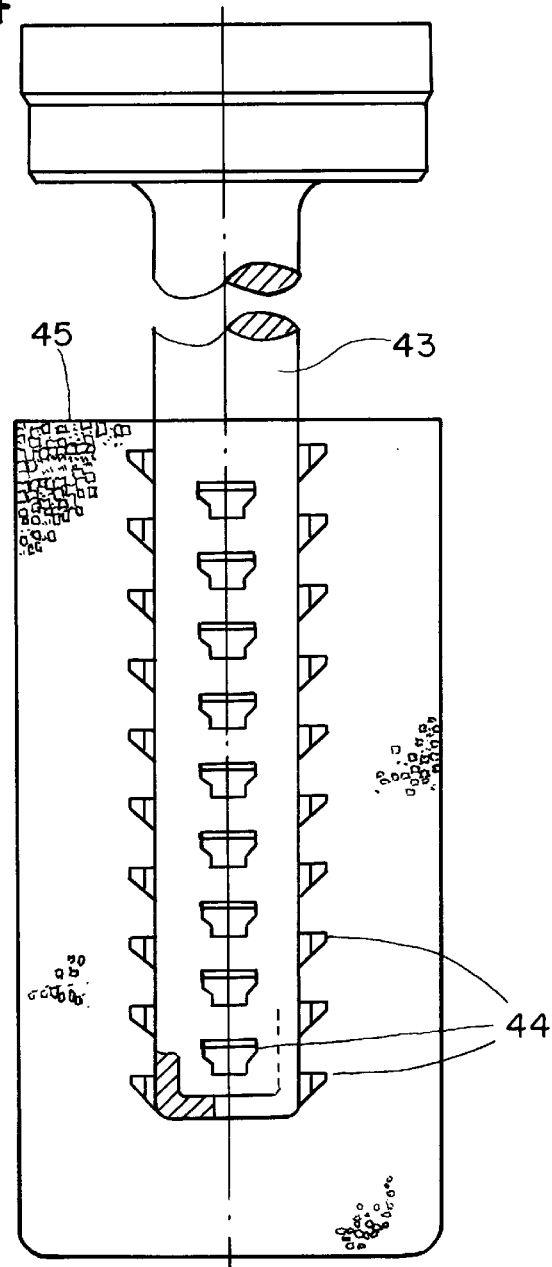
FIG. 4: An attachable tool part with a tool housing and a rotatable axle with a cleaning pad.

FIG. 4 shows an attachable tool part inside which there is a rotatable axle 43, on which is mounted a cleaning sponge 45 in this instance. At the top can be seen element 42 of the tool part, which belongs in the receiving element of housing 1, where it is held in place by the bayonet lock. In this instance the actual tool is a rotating rod 43 with radially projecting barbs 44 around its entire periphery on which is mounted an element 45 made of foam. This cleaning sponge 45 is ideal for gently cleaning all kinds of crockery and containers. In particular, all types of drinking glasses, mugs and other tall, slim vessels can easily be cleaned with it.

At the bottom of the drawing, element 42 is shown seen from above. One can see the slits 46 which are fitted over locking elements 41 in the receiving element 40 of housing 1 for the purpose of attaching the tool part. The tool part is then turned around its axle, whereupon locking elements 41 are pushed inside slits 46 into the zone 47 with the narrower slit at the top. This ensures that the tool part is held securely in the receiving element 40 of the housing and fixed in place by the clamping effect of locking elements 41 in slits 46 of the bayonet lock.

Figure 5:
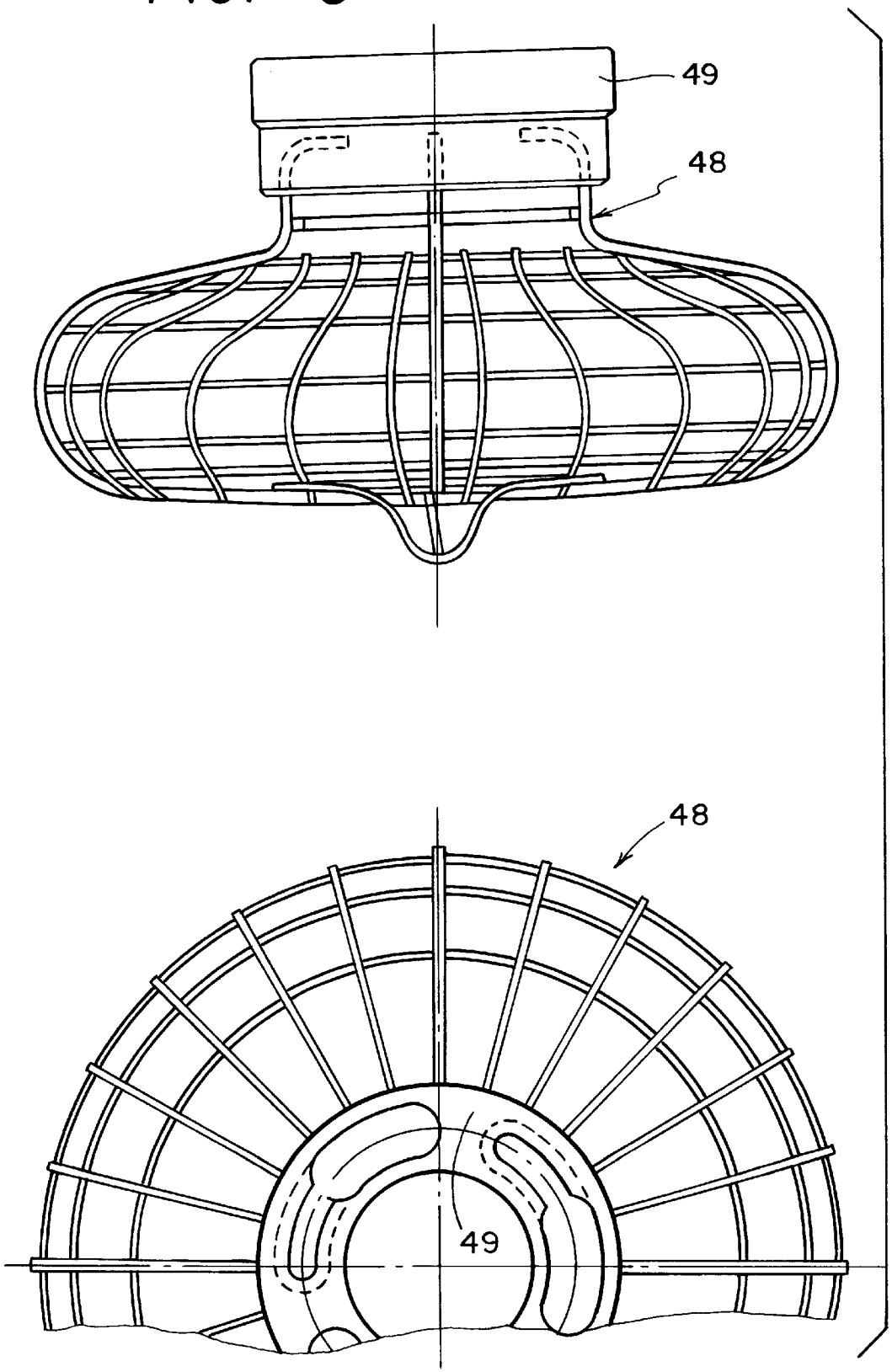
FIG. 5: An attachable tool part in the form of a washing basket.

FIG. 5 shows a tool consisting essentially of a wire basket 48 with a door for inserting small objects for washing. The top of this wire basket 48 is fixed to a connecting piece 49, inside which are the elements required to attach this tool part to a revolving plate mounted on hand-held housing 1. This tool part can, however, also be designed so that the top part of the connecting piece 49 is connected rigidly to housing 1, whilst its bottom part rotates together with the container attached to it because it is driven by a central axle that runs through the connecting piece. This tool can be used, for example,, for washing potatoes, fruits, vegetables and salads. These items are placed in the wire basket and then the wire basket is immersed in water and rotated until the contents are clean. In commerce and industry a variety of small parts can be cleaned by being immersed in a solvent, for example, by rotating the wire basket and exposing the small parts to the flow of the solvent. At the bottom of the drawing the tool part is shown viewed from above. Hence the slits in connecting piece 49 forming part of the bayonet locks are visible.

Figure 6:
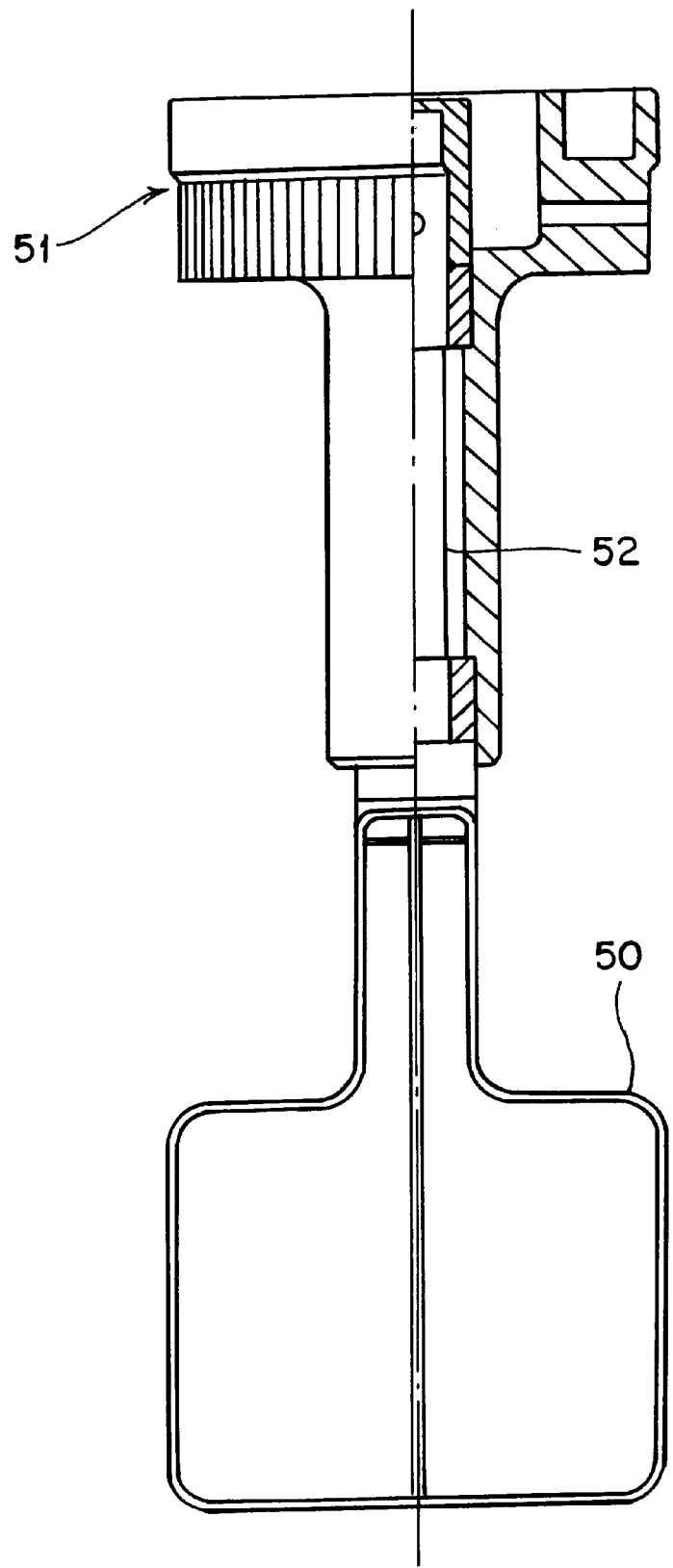
FIG. 6: An attachable tool part in the form of a beater attachment.

FIG. 6 shows a tool part which can be used as a beater attachment 50. The connecting piece 51 again has bayonet locks, and it is traversed by a central drive axle 52 which is connected at the bottom with the wire loop 50 forming the beater attachment.

Figure 7:
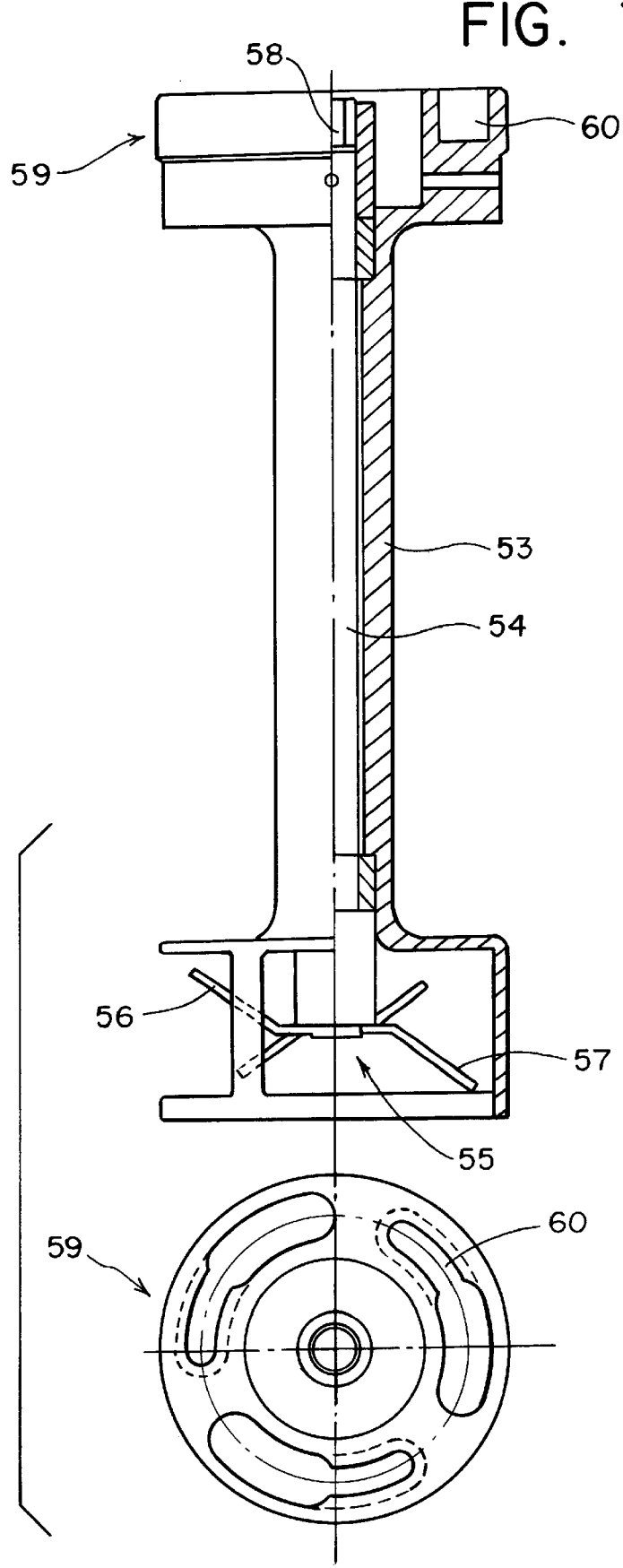
FIG. 7: An attachable tool part in the form of a chopper or blender.

In FIG. 7, the tool part is a chopper or blender. To this end the tool part has a housing 53 with a central driven axle 54. Attached to the bottom end of the driven axle there is a knife 55 with radially projecting blades bent upwards 56 and downwards 57. Housing 53 is attached to the housing by means of bayonet locks, with hexagonal element 58 being connected to an internal hexagonal element on the driven axle of the housing. On connecting piece 59 one can see a slit 60, which belongs to a bayonet lock. At the bottom of the drawing this connecting piece 59 is shown viewed from above.

Figure 8:
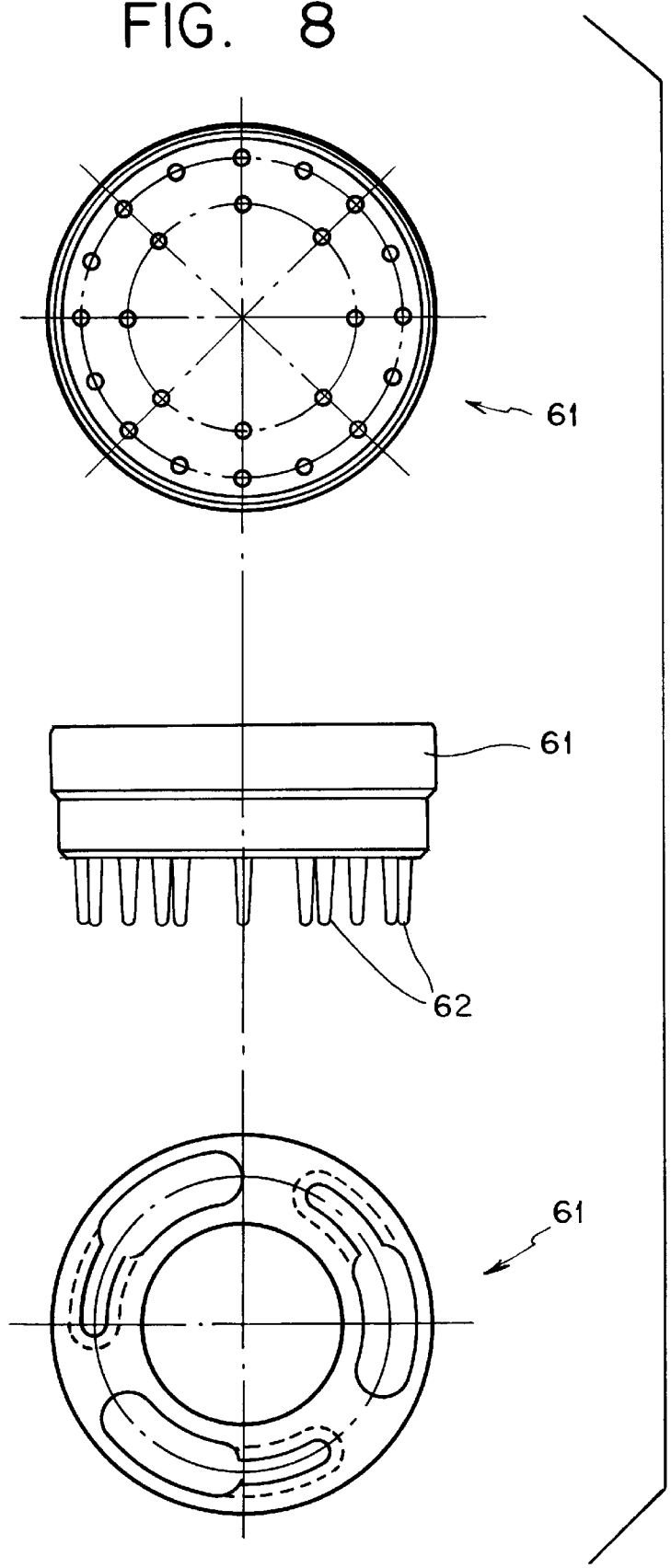
FIG. 8: An attachable tool part in the form of a cleaning brush with strong studs.

FIG. 8 shows a kind of cleaning brush 61 with strong studs 62. In this instance the entire connecting piece rotates as well. The top drawing shows this brush 61 seen from below, in the drawing in the middle it can be seen from the side and in the drawing at the bottom it can be seen from above. Studs 62 are made from injection-moulded plastic and are so strong that this brush can almost be used like a wire scouring pad to gently remove stubborn dirt from whatever object is being cleaned.

Figure 9:
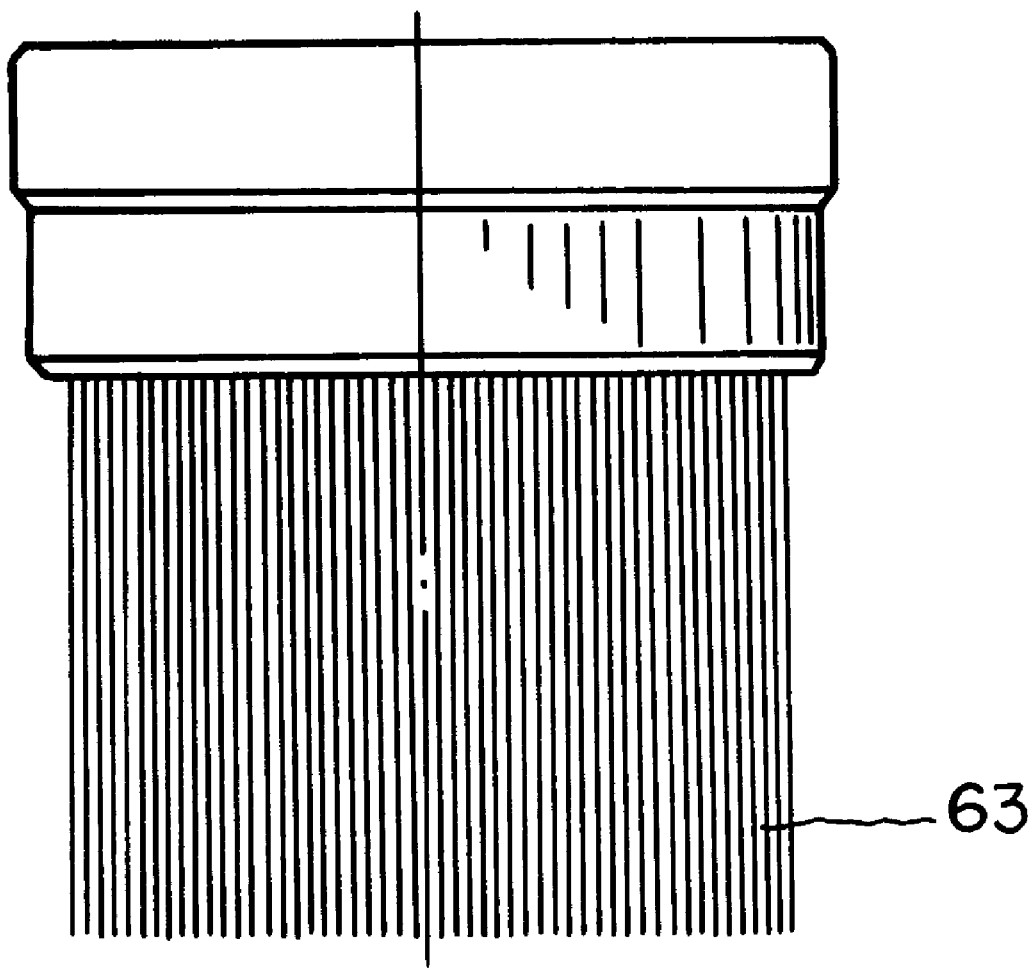
FIG. 9: An attachable tool part in the form of a soft cleaning brush.

In FIG. 9, the tool part is another common brush with bristles 63; said brush can also be attached to the housing by means of bayonet locks. A brush of this type can be used to clean all sorts of objects. This brush is very convenient for washing very dirty shoes or boots, for example, because the shoe or boot can be held under the running water and the brush can be used without any danger.

The main advantages of the hand-held appliance for domestic and industrial use according to this invention are that, firstly, there is no motor in the hand-held part, which can be kept light as a result, and, secondly, there are no electric parts in the hand-held part, which can therefore be used entirely or partially immersed in water without any danger whatsoever. It is clear that a motor-driven hand-held appliance that operates according to this principle can be fitted with a large variety of different tool parts which cannot possibly all be described here. It is also worth mentioning, for example, a polishing disc for polishing furniture, car bodywork or other utilitarian objects. Another possibility is a massage brush for danger-free use in the shower or bath, even fully immersed under water. The brush can also be used for actually washing the body in a shower or a bath.

A hand-held appliance, of this type is ideal for domestic use, with the motor being positioned on top of the worktop for example, or above it. The hand-held appliance then hangs down ready to use above the working surface, with the length of the driving shaft and the Bowden cable being dimensioned so that the hand-held appliance has a large operating radius. The appropriate tool can quickly be attached as required and the operator can start work right away, under water or in running water as already mentioned. A hand-held appliance of this type is very convenient, particularly for cleaning saucepans with burnt-on crusts. With its relatively powerful motor it works far more quietly than kitchen appliances fitted with high-speed motors. Further, a fixed motor of this type can easily be moved around within an apartment when, for example, cleaning work has to be done in other rooms, whether this be furniture polishing or cleaning windows, carpets or floors.

What is claimed is:

1. Powered hand-held appliance for domestic and industrial use, comprising a fixed motor and a hand-held appliance part on which a tool is mounted, which is connected with the fixed motor via a driving shaft and a Bowden cable device only, the hand-held appliance part having a slide which can be operated with one finger of the hand holding the appliance part, with varying amounts of traction being applicable to the cable of the Bowden cable device as a result of the movement of the slide, thereby providing a way for regulating the power of the motor.

2. The powered hand-held appliance of claim 1, wherein the hand-held appliance part includes a housing inside which there is a worm gear, with the driving shaft leading to the appliance part driving the worm, which in turn engages in a worm wheel, whose driven axle projects out of the housing so that a variety of different tool parts can be attached to this driven axle.

3. The powered hand-held appliance of claim 2, wherein the hand-held appliance part has a housing that fits in the palm of a hand by which it is gripped, with the worm gear being arranged so that its driven axle runs approximately at a right angle to the palm of the hand holding housing, and slide lies opposite thumb of the hand holding housing and can be pushed by thumb into the inside of the housing.

4. The powered hand-held appliance of claim 2, wherein the hand-held appliance part has a tool housing inside which there is a rotatable axle on the end of which is mounted the actual tool, with the tool housing being attached to housing by means of a bayonet lock, and with the driven axle of housing engaging by friction with the rotatable axle of tool part.

5. The powered hand-held appliance of claim 4, wherein the actual tool is a round brush.

6. The powered hand-held appliance of claim 4, wherein the actual tool is a wire basket with a door for inserting small parts for washing.

7. The powered hand-held appliance of claim 4, wherein the actual tool includes a rotating rod with radially projecting barbs around its entire periphery, on which is mounted an element made of foam.

8. The powered hand-held appliance of claim 4, wherein the actual tool is a flat brush.

9. The powered hand-held appliance of claim 1, wherein the hand-held appliance part has said slide, whose end projects out of housing and which has a toothed rack in its direction of movement which engages in a pinion, which in turn engages in another toothed rack which is connected with the end of the cable of the Bowden cable device, with a cable sheath of the Bowden cable device encountering a stop on housing.

10. The powered hand-held appliance of claim 1, wherein said slide can be operated against a compression spring disposed inside housing, and in said slide is provided with means for blocking it in a particular position inside housing.

* * * * *